Patented July 22, 1952

2,604,459

UNITED STATES PATENT OFFICE 2,604,459

METHOD OF STABILIZING VINYL OR VINYLIDENE CHLORIDE - CONTAINING POLYMERS

Erwin M. Jankowiak, Midland, Mich., assignor to The Dow Chemical Company, Midland, Mich., a corporation of Delaware No Drawing. Application December 4, 1950, Serial No. 199,162

5 Claims. (Cl. 260—45.7)

1

This invention relates to a method of stabilizing polymers comprising vinyl or vinylidene chlorides and, more particularly, it relates to a new and improved process for the production of such polymers having a high resistance to the decompositional effects of heat and light.

It is recognized that polymeric vinyl chloride, its copolymers, polyvinylidene chloride and its copolymers generally require one or more protective agents to be present in their compositions if such polymeric substances are to be exposed to heat and light without undergoing decomposition. Thus, when such a polymeric product is to be molded or extruded, it is necessary to incorporate in the plastic composition a material capable of minimizing the injurious effects of prolonged exposure to heat. Similarly, if the molded or extruded product is one which would normally be exposed for prolonged periods to direct sunlight or equivalent radiation, it is highly desirable to incorporate in the composition, prior to molding or extrusion, an agent which will give protection against the discoloring effect of such exposure to light. Among the various stabilizing agents which have been found useful are certain inorganic compounds including tetrasodium pyrophosphate, disodium and trisodium orthophosphate, sodium phosphite, and the like. These stabilizers have aided materially in preventing thermal degradation of polymeric bodies comprising vinyl or vinylidene chlorides, and in protecting them against the effects of light.

It has also been observed that these polymers are particularly subject to thermal decomposition, when they contain even trace amounts of certain metal salts, particularly iron salts. These iron salt impurities may be present as a result of contact of the polymer with polymerization or processing equipment, or may be acquired from water used as the polymerization medium or they may occur as impurities in various modifiers added to the polymer. Such impurities are ordinarily not easily removed from the polymer by the usual washing methods.

2

An object of the present invention is to provide a process for stabilizing polymers comprising vinyl or vinylidene chlorides against the decompositional effects of heat and light. Another object is to provide a method whereby stabilizers may be dispersed uniformly throughout a polymer comprising vinyl or vinylidene chlorides, to provide improved light and thermal stability. It is a further object to provide a process for treating polymers comprising vinyl or vinylidene chlorides to overcome the adverse effects of inorganic impurities. Other and related objects may appear hereinafter.

It has now been found that the foregoing and related objects may be attained by employing a particular method for introducing tetrasodium pyrophosphate or other alkali metal pyrophosphates, orthophosphates, or phosphites into a virgin form of a finely-divided polymeric product comprising vinyl or vinylidene chlorides, in a manner to render harmless such inorganic impurities as iron compounds.

As used herein, and in the trade, the term "virgin polymer" refers to a polymer in its unmodified state, as obtained from the polymerization reaction, and before it has been subjected to the adverse effects of heat or light. Such a polymer may have been washed and dried, but has not been compounded or fabricated.

According to the present invention the desired result is obtained by wetting a virgin form of a finely-divided polymeric product with an aqueous solution of an inorganic stabilizer selected from the class consisting of alkali metal pyrophosphates, orthophosphates, and phosphites, which solution has been acidified to have a pH value in the range of 3.5 to 5, separating the polymeric product from a part of the solution, and substantially drying the polymeric product. Some of the solution of inorganic stabilizer is left on the polymer, in an amount and of such a concentration that the treated and dried polymeric product contains at least 0.05 and no more than 2 per cent by weight of the stabilizer. Aqueous, acidic solutions in the range of 0.5 to 6 per cent by weight of the stabilizer may be used conveniently to deposit in the dried polymeric product such an amount of stabilizer. When tetrasodium pyrophosphate is employed in an acid solution having a pH value in the range of 3.5 to 5, other salts may be formed such as the di- and tri-sodium hydrogen pyrophosphates, and these also serve as stabilizers.

The solution of the inorganic stabilizer contains a water-soluble acid, preferably a mineral acid, in sufficient quantity to reduce the pH value of the solution to within the range of 3.5 to 5. The following are examples of acids which may be used for this purpose: hydrochloric acid, sulphuric acid, nitric acid, acetic acid, and paratoluene sulphonic acid. Nitric acid is preferred for lowering the pH value because it forms the most soluble salts of many metals which may occur as impurities. By employing such solutions, it has been found that iron salts and similar impurities are effectively removed from or rendered harmless in the polymer.

According to the present invention, the step of wetting the polymeric product with the acidic solution of inorganic stabilizer may conveniently be carried out by stirring the virgin polymeric product with an amount of the solution sufficient to form a slurry and subsequently separating the polymeric product from most of the liquid in the slurry and then drying the product without further washing. The treatment may be carried out on a filter, following normal washing operations, if desired, as is shown in a later example. By this method, the iron salts are removed from or rendered harmless in the polymer, and the polymeric product, when separated from the excess solution and dried, contains a stabilizing amount of a phosphate, pyrophosphate or phosphite uniformly dispersed throughout each particle.

The invention is applicable to polymeric compositions comprising significant amounts (10% or more) of either vinyl or vinylidene chloride. As examples of polymers which are stabilized in accordance with the present invention, the following may be named: polyvinyl chloride, polyvinylidene chloride, vinylidene chloride-vinyl chloride copolymers, vinyl chloride-vinyl acetate copolymers, vinyl chloride-vinyl cyanide copolymers, vinyl chloride-acrylic ester copolymers, vinyl chloride-methacrylic ester copolymers, vinylidene chloride-vinyl acetate copolymers, vinylidene chloride-vinyl cyanide copolymers, vinylidene chloride-acrylic ester copolymers, and vinylidene chloride-methacrylic ester copolymers. Regardless of the method (whether by emulsion or by non-emulsified aqueous suspension) by which the polymers or copolymers are prepared, a marked stabilizing effect on the virgin polymer is exhibited after treatment according to the process of the present invention. Thus, an initially light colored film or filament prepared from one of these polymers generally assumes a dark brown or black coloration after short exposure to a temperature of 150° C. or after an exposure of less than 100 hours to direct ultra-violet radiation. In contrast, analogous articles prepared from the same polymers but treated according to the method of the present invention, remain substantially unchanged after 3 hours' exposure to a temperature of 150° C. or after an exposure of more than 200 hours to direct ultra-violet radiation.

The following example illustrates, in specific detail, a preferred method of carrying out the process of the present invention, it being understood that the invention is not limited to the details set forth in the example.

*Example*

A commercial grade of polyvinyl chloride was prepared by a standard polymerization procedure, in an aqueous medium, and separated at the end of the process by centrifugalizing the liquid medium therefrom. The polymeric product was then washed several times with water and finally separated from substantially all wash-water. About 200 grams of the virgin polyvinyl chloride product was slurried with about 400 grams of water and subjected to the action of a small basket centrifuge. To the whirling wheel-cake of the polymer was added 50 milliliters of a 2 per cent solution of tetrasodium pyrophosphate, which had been acidified with nitric acid to a pH value of 5. Centrifuging was continued until substantially no more filtrate was obtained. The polymeric product was then dried in an oven overnight at a temperature of 60° C. Other samples of the polyvinyl chloride product were treated with larger and smaller volumes of acidified 2 per cent tetrasodium pyrophosphate solution. This technique furnished samples containing various residual amounts of solid pyrophosphate intimately dispersed through the polymer. The polyvinyl chloride samples so obtained exhibited superior heat and light stability in comparison to the water-washed polyvinyl chloride obtained directly from the polymerization process. Thus, 70 parts by weight of each of the samples of polyvinyl chloride, treated according to the method of the present invention were compounded with 30 parts by weight of dioctyl phthalate, a common plasticizer. The compositions were then milled over hot rolls (150° C.) for 5 minutes and subsequently molded into samples of uniform thickness (about 0.045 inch). Blank samples were similarly prepared from a composition differing only in that the polyvinyl chloride employed had not been treated according to the method of the present invention, but had been merely water-washed and dried. Samples of the blank and of the compositions containing various residual amounts of pyrophosphate were tested for heat and light stability. Some of the samples were heated at a temperature of 150° C. for various lengths of time while others were exposed to ultra-violet rays, under standard conditions, for 100 hours, observations being made on all test samples before, during, and after the heat and light exposure. Other samples of the same compositions were held in a heated molding press at 175° C. for periods of from 1 to 4 minutes. For purposes of comparison with the samples described above, another series of samples was prepared from virgin polymer which had been washed with the usual alkaline solution of tetrasodium pyrophosphate instead of the acidified solution of this invention, and similar observations were made as to the effects of heat and light on these samples. It is noted that the virgin polymer had a high initial color which was removed by the acidified pyrophosphate treatment and which is believed to have been due to iron salt impurities. The amount of decomposition was judged from the darkening of the various samples and this in turn was graded according to the Gardner (color standard) numerical scale from 1 to 18, wherein 1 refers to a colorless product at the top of the scale and 18 to a very dark brown or black product at the bottom of the scale. These results are reported in Table I.

Table I

| Treatment of Virgin Polymer With Pyrophosphate | | Color Rating of Samples | | | | | | | | | |
|---|---|---|---|---|---|---|---|---|---|---|---|
| Per Cent in Polymer | pH of Solution used | Hours Heated in Air at 150° C. | | | | | Minutes Heated in Closed Press at 175° C. | | | Hours Exposed to Ultra-Violet | |
| | | 0 | ½ | 1 | 2 | 3 | 1 | 2 | 4 | 0 | 100 |
| None | ---- | 8 | 10 | 12 | 16 | 18 | 5 | 8 | 10 | 8 | 16 |
| 0.05 | 5 | 1 | 2 | 4 | 16 | 18 | ---- | ---- | ---- | 1 | 2 |
| 0.19 | 5 | 1 | 2 | 2 | 3 | 6 | ---- | ---- | ---- | 1 | 1 |
| 0.33 | 5 | 1 | 2 | 2 | 3 | 3 | 1 | 1+ | 2 | 1 | 1 |
| 0.33 | 9.5 | 3 | 4 | 5 | 18 | 18 | 2 | 5 | 6 | 3 | 4 |

Other heat and light stability tests were carried out on samples of compositions prepared similarly to those of the example. These comprised the usual blank, referred to as "A"; those obtained by the method of the present invention containing a residual amount (about 0.3%) of pyrophosphate, referred to as "B"; and samples like "B," which had been given an additional washing with water, and are referred to as "C." The results are reported in Table II. It is observed that the benefits of the present method are lost when the treatment with acidified stabilizer is followed by a water wash.

Table II

| Samples of Polyvinyl Chloride Compositions | Color Rating of Samples | | | | | | |
|---|---|---|---|---|---|---|---|
| | Time Heated at 150° C. (hours) | | | | | Time Exposed to Ultra-Violet radiation (hours) | |
| | 0 | ½ | 1 | 2 | 3 | 0 | 100 |
| A | 3 | 6 | 9 | 13 | 15 | 3 | 17 |
| B | 1 | 2 | 2 | 3 | 3 | 1 | 2 |
| C | 3 | 4 | 4 | 12 | 15 | 3 | 14 |

Similarly, a copolymer of 85 per cent vinylidene chloride and 15 per cent vinyl chloride exhibited an improved heat and light stability after being treated according to the method of the present invention. These and other tests show that the invention is applicable generally to all polymeric vinyl or vinylidene chloride compositions, which tend to darken when heated or exposed to ultra-violet radiation, prolonging in each case the useful life of the polymer under exposure to heat and light.

I claim:

1. The method which comprises wetting a virgin form of a finely-divided polymeric product containing at least 10 per cent of a member selected from the group consisting of vinyl chloride and vinylidene chloride, with an acidified aqueous solution of a stabilizer selected from the class consisting of alkali metal pyrophosphates, orthophosphates, and phosphites, the solution having a pH value in the range of 3.5 to 5, separating the polymeric product from enough of the solution to leave in the product between 0.05 and 2 per cent by weight of the stabilizer, and drying the polymeric product while the latter still contains the said amount of stabilizer.

2. The method as claimed in claim 1 wherein the polymeric product is polyvinyl chloride.

3. The method as claimed in claim 1 wherein the polymeric product is a copolymer composed of vinyl chloride and vinylidene chloride.

4. The method as claimed in claim 1 wherein the stabilizer is tetrasodium pyrophosphate.

5. The method which comprises wetting a virgin form of finely-divided polyvinyl chloride with an aqueous solution of tetrasodium pyrophosphate and nitric acid, the solution having a pH value in the range of 3.5 to 5, separating the polyvinyl chloride from enough of the solution to leave in the product between 0.05 and 2 per cent by weight of the pyrophosphate stabilizer, and drying the polyvinyl chloride.

ERWIN M. JANKOWIAK.

REFERENCES CITED

The following references are of record in the file of this patent:

UNITED STATES PATENTS

| Number | Name | Date |
|---|---|---|
| 2,482,038 | Temple | Sept. 13, 1949 |